United States Patent
Luo

(10) Patent No.: US 12,095,810 B2
(45) Date of Patent: *Sep. 17, 2024

(54) GENERATING AND ANALYZING NETWORK PROFILE DATA

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/493,577

(22) Filed: Oct. 4, 2021

(65) Prior Publication Data
US 2022/0141250 A1 May 5, 2022

Related U.S. Application Data

(63) Continuation of application No. 16/777,694, filed on Jan. 30, 2020, now Pat. No. 11,153,343, which is a
(Continued)

(51) Int. Cl.
*H04L 9/40* (2022.01)
*H04L 12/28* (2006.01)
(Continued)

(52) U.S. Cl.
CPC ...... *H04L 63/1458* (2013.01); *H04L 12/2827* (2013.01); *H04L 41/0853* (2013.01);
(Continued)

(58) Field of Classification Search
CPC . H04L 12/28; H04L 12/2827; H04L 41/0853; H04L 45/74; H04L 63/0428;
(Continued)

(56) References Cited

U.S. PATENT DOCUMENTS 6,279,113 B1 * 8/2001 Vaidya ............... H04L 63/1416
709/229
6,678,827 B1 * 1/2004 Rothermel ............ H04L 41/22
709/229
(Continued)

FOREIGN PATENT DOCUMENTS

| CN | 1536808 A | 10/2004 |
|---|---|---|
| CN | 103634786 A | 3/2014 |
| CN | 105518687 A | 4/2016 |

OTHER PUBLICATIONS

Search query report from IP.com (performed Apr. 3, 2023) (Year: 2023).*
(Continued)

*Primary Examiner* — Sharon S Lynch

(57) ABSTRACT

A device may generate network profile data indicating a set of network parameters detected by the device. The device may encrypt the network profile data and may transmit the encrypted network profile data to a network device, such as a router, or a server. The router or server may analyze the encrypted network profile data to determine if the device is secure. The router of server may perform one or more security measures if the device is not secure.

18 Claims, 6 Drawing Sheets

US 12,095,810 B2
Page 2

Related U.S. Application Data continuation of application No. 15/847,672, filed on Dec. 19, 2017, now Pat. No. 10,594,725.

(60) Provisional application No. 62/537,857, filed on Jul. 27, 2017.

(51) Int. Cl.
- *H04L 41/0853* (2022.01)
- *H04L 45/74* (2022.01)
- *H04L 67/12* (2022.01)
- *H04L 67/30* (2022.01)
- *H04W 4/70* (2018.01)

(52) U.S. Cl.
CPC .......... *H04L 45/74* (2013.01); *H04L 63/0428* (2013.01); *H04L 63/083* (2013.01); *H04L 63/1425* (2013.01); *H04L 63/1466* (2013.01); *H04L 67/12* (2013.01); *H04L 67/30* (2013.01); *H04W 4/70* (2018.02); *H04L 12/28* (2013.01)

(58) Field of Classification Search
CPC ............... H04L 63/083; H04L 63/1425; H04L 63/1458; H04L 63/1466; H04L 67/12; H04L 67/30; H04W 4/70
See application file for complete search history.

(56) References Cited

U.S. PATENT DOCUMENTS

| | | | |
|---|---|---|---|
| 6,909,713 B2 * | 6/2005 | Magnussen | H04L 49/3009 711/216 |
| 7,181,769 B1 * | 2/2007 | Keanini | H04L 63/1416 726/25 |
| 7,302,584 B2 * | 11/2007 | Tarbotton | G06F 21/52 713/188 |
| 7,325,248 B2 * | 1/2008 | Syvanne | H04L 63/107 713/166 |
| 7,328,349 B2 * | 2/2008 | Milliken | H04L 51/212 713/160 |
| 7,383,577 B2 * | 6/2008 | Hrastar | H04L 63/1416 713/168 |
| 7,552,323 B2 * | 6/2009 | Shay | H04L 63/02 713/153 |
| 7,634,811 B1 * | 12/2009 | Kienzle | H04L 63/02 726/22 |
| 7,673,793 B2 * | 3/2010 | Greene | G06Q 30/06 235/382 |
| 7,778,194 B1 * | 8/2010 | Yung | H04L 43/00 709/224 |
| 7,899,866 B1 * | 3/2011 | Buckingham | H04L 51/212 709/206 |
| 7,933,208 B2 * | 4/2011 | Bronnimann | H04L 63/145 713/154 |
| 8,060,939 B2 * | 11/2011 | Lynn | H04K 3/65 713/168 |
| 8,239,668 B1 * | 8/2012 | Chen | H04L 63/20 713/153 |
| 8,316,429 B2 * | 11/2012 | Long | H04L 63/0236 713/160 |
| 8,331,234 B1 * | 12/2012 | Newton | H04L 43/04 370/231 |
| 8,577,817 B1 * | 11/2013 | Keralapura | G06N 20/00 370/235 |
| 8,582,567 B2 * | 11/2013 | Kurapati | H04M 7/0078 370/352 |
| 8,595,846 B1 * | 11/2013 | Etheredge | H04L 63/1416 726/26 |
| 8,601,082 B1 * | 12/2013 | Duan | H04L 63/1425 713/188 |
| 8,943,201 B2 * | 1/2015 | Larson | H04L 63/029 709/227 |
| 8,964,548 B1 * | 2/2015 | Keralapura | H04L 43/026 370/235 |
| 9,009,827 B1 * | 4/2015 | Albertson | H04L 63/14 726/22 |
| 9,015,090 B2 * | 4/2015 | Chien | H04L 63/101 706/22 |
| 9,043,587 B1 * | 5/2015 | Chen | G06F 21/552 713/153 |
| 9,177,293 B1 * | 11/2015 | Gagnon | H04L 51/212 |
| 9,215,244 B2 * | 12/2015 | Ayyagari | H04L 63/1425 |
| 9,231,972 B2 * | 1/2016 | Ou | H04L 63/145 |
| 9,356,942 B1 * | 5/2016 | Joffe | H04L 63/1408 |
| 9,398,037 B1 * | 7/2016 | Roskind | H04L 63/1433 |
| 9,412,073 B2 * | 8/2016 | Brandt | H04L 63/20 |
| 9,413,777 B2 * | 8/2016 | Zuk | H04L 63/1425 |
| 9,477,825 B1 * | 10/2016 | Sinchak | H04L 63/08 |
| 9,495,188 B1 * | 11/2016 | Ettema | H04L 63/0245 |
| 9,514,293 B1 * | 12/2016 | Moritz | H04L 67/143 |
| 9,584,541 B1 * | 2/2017 | Weinstein | H04L 63/1441 |
| 9,680,846 B2 * | 6/2017 | Haugsnes | H04L 63/1416 |
| 9,692,772 B2 * | 6/2017 | Hart | H04L 63/14 |
| 9,710,644 B2 * | 7/2017 | Reybok | G06F 21/552 |
| 9,756,082 B1 * | 9/2017 | Haugsnes | H04L 63/1425 |
| 9,813,310 B1 * | 11/2017 | Sieracki | H04L 43/18 |
| 9,882,925 B2 * | 1/2018 | Seiver | H04L 43/0876 |
| 9,900,300 B1 * | 2/2018 | Bennett | H04L 67/143 |
| 10,027,473 B2 * | 7/2018 | Castellucci | H04L 9/0643 |
| 10,032,020 B2 * | 7/2018 | Reybok | G06F 21/552 |
| 10,075,464 B2 * | 9/2018 | Kesin | G06N 7/01 |
| 10,091,180 B1 * | 10/2018 | Moritz | H04L 67/306 |
| 10,491,609 B2 * | 11/2019 | Katzir | H04L 63/306 |
| 10,686,831 B2 * | 6/2020 | Anderson | H04L 63/145 |
| 10,733,295 B2 * | 8/2020 | El-Moussa | G06F 21/53 |
| 10,805,338 B2 * | 10/2020 | Kohout | H04L 63/1441 |
| 10,862,911 B2 * | 12/2020 | Dezent | H04L 63/145 |
| 10,944,763 B2 * | 3/2021 | Katzir | G06N 20/00 |
| 11,303,652 B2 * | 4/2022 | Katzir | H04L 63/306 |
| 2003/0043825 A1 * | 3/2003 | Magnussen | H04L 49/3009 370/389 |
| 2003/0108042 A1 * | 6/2003 | Skillicorn | H04L 47/2441 709/224 |
| 2003/0115485 A1 * | 6/2003 | Milliken | H04L 51/212 726/24 |
| 2003/0224797 A1 * | 12/2003 | Kuan | H04L 63/162 455/446 |
| 2003/0233567 A1 | 12/2003 | Lynn et al. | |
| 2004/0006621 A1 * | 1/2004 | Bellinson | G06F 16/9535 709/225 |
| 2004/0098620 A1 * | 5/2004 | Shay | H04L 63/162 713/153 |
| 2005/0076228 A1 * | 4/2005 | Davis | G06F 21/73 713/188 |
| 2005/0286535 A1 * | 12/2005 | Shrum | H04L 41/12 370/395.21 |
| 2006/0098585 A1 * | 5/2006 | Singh | H04L 69/22 370/252 |
| 2006/0168024 A1 * | 7/2006 | Mehr | H04L 63/14 709/206 |
| 2006/0190613 A1 * | 8/2006 | Corl | H04L 45/745 709/230 |
| 2006/0198313 A1 * | 9/2006 | Kitamura | H04L 43/00 |
| 2007/0073630 A1 * | 3/2007 | Greene | G06Q 50/188 705/80 |
| 2007/0180510 A1 * | 8/2007 | Long | H04L 63/0823 726/10 |
| 2007/0192870 A1 * | 8/2007 | Lynn | H04L 63/1441 726/26 |
| 2007/0298720 A1 * | 12/2007 | Wolman | H04W 12/122 455/66.1 |
| 2008/0123545 A1 * | 5/2008 | Watanabe | H04L 43/026 709/224 |
| 2008/0127338 A1 * | 5/2008 | Cho | G06F 21/566 726/22 |
| 2008/0201763 A1 * | 8/2008 | Lynn | H04K 3/224 726/1 |
| 2008/0282080 A1 * | 11/2008 | Hyndman | H04L 63/0218 726/1 |

(56) References Cited

U.S. PATENT DOCUMENTS

| | | | | |
|---|---|---|---|---|
| 2010/0138910 A1* | 6/2010 | Aldor | H04L 63/0236 | 726/14 |
| 2011/0039579 A1* | 2/2011 | Karjalainen | H04W 4/029 | 455/456.1 |
| 2011/0082768 A1* | 4/2011 | Eisen | G06Q 30/0609 | 705/26.35 |
| 2011/0289559 A1* | 11/2011 | Jacoby | H04L 63/1416 | 726/3 |
| 2012/0042086 A1* | 2/2012 | Larson | H04L 63/1491 | 709/228 |
| 2012/0210429 A1* | 8/2012 | Stute | H04L 63/1408 | 726/23 |
| 2012/0240185 A1* | 9/2012 | Kapoor | H04L 41/0866 | 726/1 |
| 2013/0014261 A1* | 1/2013 | Milliken | H04L 51/212 | 726/24 |
| 2013/0305357 A1* | 11/2013 | Ayyagari | H04L 41/069 | 726/22 |
| 2013/0333038 A1* | 12/2013 | Chien | G06F 21/645 | 726/23 |
| 2014/0310391 A1* | 10/2014 | Sorenson, III | H04L 43/0817 | 709/223 |
| 2014/0321462 A1* | 10/2014 | Kancherla | H04L 45/72 | 370/389 |
| 2015/0003433 A1* | 1/2015 | Sinha | H04L 63/18 | 370/338 |
| 2015/0113629 A1* | 4/2015 | Park | H04L 63/02 | 726/13 |
| 2015/0213369 A1* | 7/2015 | Brandt | G06N 5/047 | 706/12 |
| 2015/0324563 A1* | 11/2015 | Deutschmann | G06F 16/285 | 726/7 |
| 2016/0036785 A1* | 2/2016 | Ambroz | H04L 63/062 | 713/170 |
| 2016/0065570 A1* | 3/2016 | Spencer, III | G06Q 30/06 | 726/7 |
| 2016/0241705 A1* | 8/2016 | Benoit | H04M 1/724631 | |
| 2016/0344550 A1* | 11/2016 | Anton | H04L 9/3236 | |
| 2017/0041145 A1* | 2/2017 | Sinchak | H04L 63/083 | |
| 2017/0163694 A1* | 6/2017 | Skuratovich | H04L 67/5651 | |
| 2017/0351861 A1* | 12/2017 | El-Moussa | G06F 21/566 | |
| 2017/0374087 A1* | 12/2017 | Akashi | H04L 63/1416 | |
| 2018/0103060 A1* | 4/2018 | Li | H04L 47/25 | |
| 2018/0109542 A1* | 4/2018 | Katzir | G06N 20/00 | |
| 2018/0115566 A1* | 4/2018 | Azvine | H04L 63/0428 | |
| 2018/0115567 A1* | 4/2018 | El-Moussa | H04L 63/1416 | |
| 2018/0211033 A1* | 7/2018 | Aditham | G06F 21/52 | |
| 2018/0285564 A1* | 10/2018 | Qu | G06F 21/566 | |
| 2018/0332005 A1* | 11/2018 | Ettema | H04L 63/0227 | |
| 2018/0332079 A1* | 11/2018 | Ashley | H04L 63/20 | |
| 2019/0052554 A1* | 2/2019 | Mukerji | H04L 41/0893 | |
| 2019/0132365 A1* | 5/2019 | Skuratovich | H04L 69/04 | |
| 2019/0245759 A1* | 8/2019 | Mukerji | H04L 67/51 | |
| 2020/0050760 A1* | 2/2020 | El-Moussa | H04L 63/145 | |
| 2020/0053104 A1* | 2/2020 | El-Moussa | G06N 3/04 | |
| 2020/0169571 A1* | 5/2020 | Katzir | G06N 20/00 | |
| 2021/0006589 A1* | 1/2021 | Kohout | H04L 63/1441 | |
| 2021/0168158 A1* | 6/2021 | Katzir | G06N 20/00 | |

OTHER PUBLICATIONS

China National Intellectual Property Administration Office Action for Application No. 2018800615981 dated Mar. 13, 2023; 10 pages.

* cited by examiner

GENERATING AND ANALYZING NETWORK PROFILE DATA

CROSS-REFERENCE TO RELATED APPLICATIONS

This application is a continuation of U.S. Non-Provisional application Ser. No. 16/777,694, filed on Jan. 30, 2020, which is a continuation of U.S. Non-Provisional application Ser. No. 15/847,672 filed on Dec. 19, 2017, now U.S. Pat. No. 10,594,725, issued on Mar. 17, 2020, which claims the benefit of U.S. Provisional Application No. 62/537,857 filed on Jul. 27, 2017, the entire contents of which are hereby incorporated by reference.

BACKGROUND

More and more computing devices are being connected with each other (e.g., being interconnected) and being connected to the Internet. Many of these computing devices may become compromised (e.g., by viruses, malware, etc.) or may become security risks. These compromised computing devices may be used to carry out online attacks (e.g., denial of service attacks) or hacking attempts on other computing devices (e.g., servers).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, computing devices may be comprised and may be used to carry out online attacks or hacking attempts. Many online attacks (such as distributed denial-of-service attack) and hacking attempts may be difficult to defend at a destination or target (of the attacks or hacking attempts) because of the multitude of computing devices from which these online attack and hacking attempts may originate. It may be easier to stop or prevent these attacks closer to the source of these attacks. It may also be easier to stop or prevent these attacks if the computing devices transmit network profile data which may allow a server to determine whether a computing devices has been compromised (e.g., is no longer secure, is a security risk, etc.). Many computing devices may not encrypt the network profile data which may cause privacy concerns for users. Users may disable the sending of network profile data due to these privacy concerns. In addition, many systems detect suspicious activity or comprised computing devices using a dedicated server (that the computing devices transmit network profile data to). This may cause the computing devices to generate additional traffic (e.g., additional messages or packets) for the dedicated server (e.g., messages between the dedicated server and another server) and may waste resources because a dedicated server is used to collect and analyze the network profile data.

The examples, implementations, and embodiments described herein may allow computing devices to provided encrypted network profile data by piggybacking the encrypted network profile data along with existing traffic to a server, or by transmitting the encrypted network profile data to a network device, such as a first-hop router. This allows a server that provides a service to a computing device to also check the encrypted network profile data to identify suspicious activity and compromised computing devices. This also allows a network device to prevent attacks or hacking attempts from reaching a server because the network device may detect suspicious activity and may prevent packets or messages from reaching the server. In addition, encrypting the network profile data allows the identity of the user to be protected, which may alleviate privacy concerns of the user.

Figure 1:
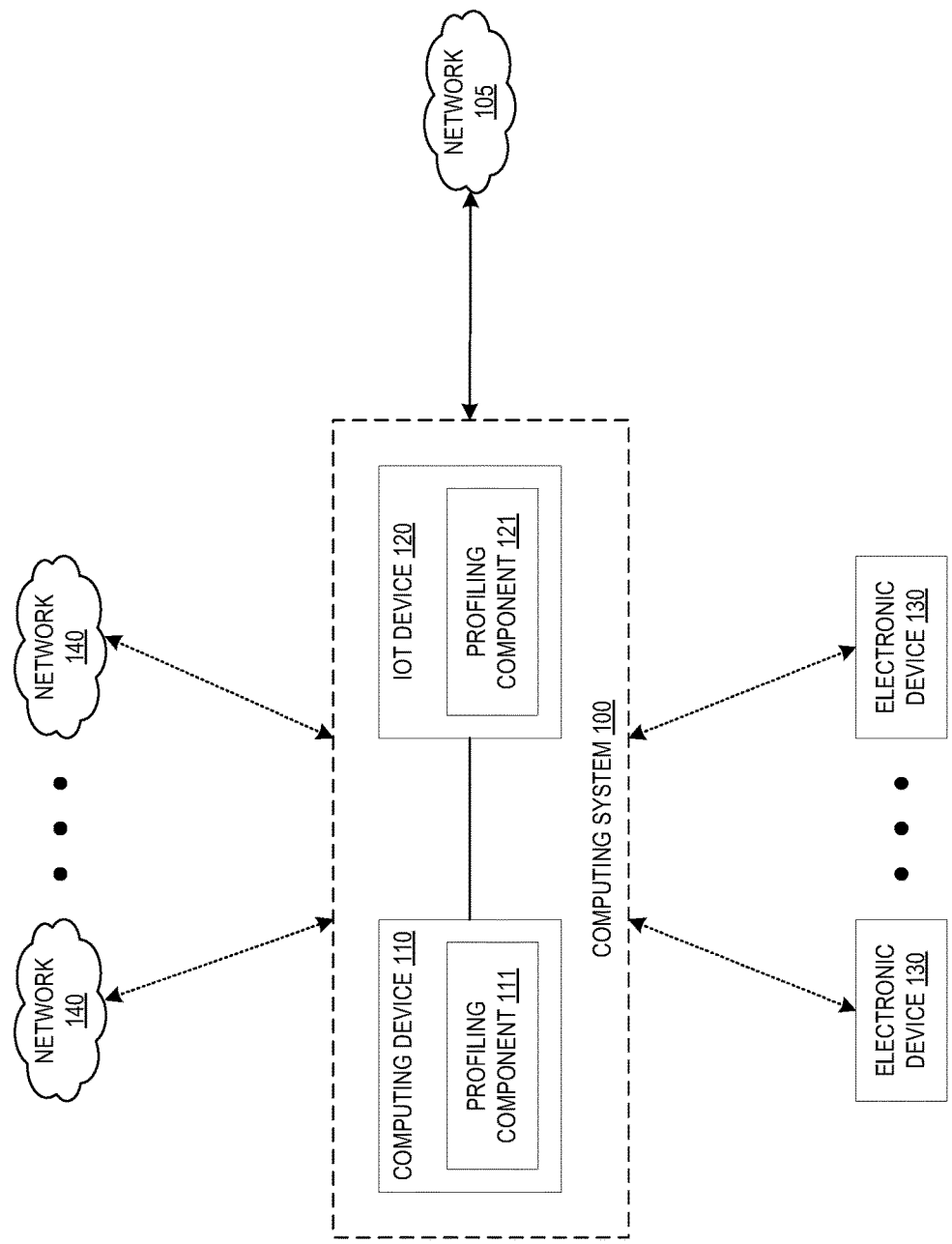
FIG. 1 illustrates a computing system, in accordance with some embodiments of the present disclosure.

FIG. 1 illustrates a computing system 100, in accordance with some embodiments of the present disclosure. The computing system 100 includes a computing device 110, and an internet-of-things (TOT) device 120. The computing device 110 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing device 110 may comprise any suitable type of computing device or machine that has a programmable processor including, for example, server computers, desktop computers, laptop computers, tablet computers, smartphones, personal digital assistants (PDAs), set-top boxes, etc. In some examples, the computing device 110 may comprise a single machine or may include multiple interconnected machines (e.g., multiple servers configured in a cluster). The computing device 110 may execute or include an operating system (OS). The OS of the computing device 110 may manage the execution of other components (e.g., software, applications, etc.) and/or may manage access to the hardware (e.g., processors, memory, storage devices etc.) of the computing device.

The TOT device 120 may allow the computing device 110 to communicate with other devices (e.g., other computing devices or other network devices, such as a router or a server). For example, the TOT device 120 may allow the computing device 110 to communicate data (e.g., transmit or receive messages, packets, frames, data, etc.) via wired or wireless infrastructure. In one embodiment, the TOT device 120 may be a network interface for the computing device 110. For example, the TOT device 120 may be a network adaptor that may be coupled to the network 105 (e.g., via a wireless medium such as radio-frequency (RF) signals). Although the TOT device 120 is shown as separate from the computing device 110, the TOT device 120 may be part of the computing device 110 in other embodiments. For example, the TOT device 120 may be installed or located within a housing (e.g., a case, a body, etc.) of the computing device 110.

The computing system 100 may communicate with other devices via network 105, as discussed in more detail below. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between computing device 110 and other devices (e.g., electronic devices, network devices, computing devices, etc.).

As illustrated in FIG. 1, the computing system 100 may be able to detect one or more networks 140 (e.g., a set of networks). Also as illustrated in FIG. 1, the computing system 100 may be connected to or may detect one or more electronic devices 130 (e.g., a set of electronic devices). For example, the computing device may be able to detect or may be connected to a Bluetooth speaker. In another example, the computing device may detect a gaming console or a media server that is using the same network 105.

In one embodiment, one or more of the profiling components 111 and 121 may detect (or collect) network parameters. The profiling components 111 and 121 may be hardware, software, firmware, or a combination thereof. The network parameters may include information about the networks (e.g., networks 140) or devices (e.g., electronic devices 130) detected by or connected to the computing system 100. The network parameters may include lower-layer information, middle-layer information, and higher-layer information. In some embodiments, the profiling components 111 and 121 may detect different network parameters. For example, the profiling component 111 may detect lower-layer information (as discussed in more detail below) and the profiling component 121 may detect middle-layer information and higher-layer information (as discussed in more detail below). In other embodiments, the profiling components 111 and 121 may be combined into one profiling component. For example, if the IOT device 120 is part of the computing device 110, the profiling components 111 and 121 may be combined into one profiling component.

In one embodiment, (with reference to the layers defined by the Internet Protocol Suite) the lower-layer information (e.g., network parameters) may include link layer or Internet layer information about the networks or the devices that may be detected by or connected to the computing system 100. For example, the lower-layer information (e.g., the network parameters) may include network addresses (e.g., internet protocol (IP) address or medium access control (MAC) addresses) of devices that are detected by the computing system 100. The lower-layer information may also include a network address (e.g., a MAC or IP address) of a first-hop router (e.g., a router that implements the network 105, such as a WiFi router). The lower-layer information may further include a network identifier for the network 150. For example, the network 105 may be a WiFi network and the lower-layer information may include a service set identifier (SSID) of the network 105. The lower-layer information may further include one or more network identifiers, such as service set identifiers (SSIDs), BSSIDs, ESSIDs, of other networks that are detected by the computing system 100. For example, the lower-layer information may include SSIDs of the one or more networks 140. In another example, the lower-layer information may include device identifiers (e.g., names, alphanumeric values, etc.) or Bluetooth addresses of devices (e.g., Bluetooth speakers, Bluetooth headers, other computing devices, etc.) that may be coupled to the computing system 100 (or may be detected by the computing system 100). In other embodiments, other types of identifiers or addresses used by other communication protocols (e.g., Bluetooth Low Energy (BLE), Zigbee, Z-wave, near field communication (NFC), etc.) may be used.

In one embodiment, (with reference to the layers defined by the Internet Protocol Suite) the middle-layer information (e.g., network parameters) may include transport layer information about the networks or the devices that may be detected by or connected to the computing system 100. For example, the middle-layer information may include a list of ports (e.g., TCP ports) that the computing system 100 is listening to (e.g., a list of ports where the computing system 100 is waiting for incoming connection requests). In another example, the middle-layer information, a list of incoming connections (e.g., IP ports of connections or communication channels that were initiated by another device). In a further example, the middle-layer information may include a list of outgoing connections (e.g., IP ports of connections or communication channels that were initiated by the computing system 100). In a further example, the middle-layer information may include a list of incoming connections that were rejected due to unopened ports on the computing system 100 (e.g., connections requests for unopened ports that were received by the computing system 100). The list of rejected incoming connections may also include the (unopened) ports that were included in the incoming connection requests. In a further example, the middle-layer information may include a list of outgoing connections that were rejected due to unopened ports on another device (e.g., connection request to ports of other devices that were rejected because of unopened ports on the other devices). The list of rejected outgoing connections may also include the (unopened) ports that were included in the outgoing connection requests.

In one embodiment, (with reference to the layers defined by the Internet Protocol Suite) the higher-layer information (e.g., network parameters) may include application layer information about the networks or the devices that may be detected by or connected to the computing system 100. For example, the higher-layer information may include a list of incoming authentication requests, authentication credentials and results (e.g., a list of incoming requests to access the computing system 100 that included authentication credentials transmitted by other devices). In another example, the higher-layer information may include a list of outgoing authentication credentials and results (e.g., a list of outgoing requests to access other devices that included authentication credentials transmitted by the computing system 100). In a further example, the higher-layer information may include a list of incoming connection requests that were rejected due to failed authentication (e.g., incoming connection requests received by the computing system 100 that were rejected because the authentication credentials were not valid). The list of rejected incoming connections may include network addresses (e.g., IP address of devices that transmitted the incoming connection request) and ports of the computing system 100 where the (rejected) incoming connection requests were received. In a further example, the higher-layer information may include a list of outgoing connections that were rejected due to failed authentication (e.g., outgoing connection requests transmitted by the computing system that were rejected because authentication credentials provided by the computing system 100 were not valid). The list of rejected outgoing connections may include network addresses of the devices that received the outgoing connection requests from the computing device and may include the ports of the computing device that were used to transmit the outgoing connection requests.

In one embodiment, one or more of the profiling components 111 and 121 may combine some or all of the network parameters (that were detected by the computing device 110 and the IOT device 120) to generate network profile data, as discussed in more detail below. The profiling components 111 and 121 may encrypt the network profile data and may transmit the encrypted network profile data to a router (e.g., a WiFi router that implements the network 105) or a server (not illustrated in FIG. 1), as discussed in more detail below. For example, the profiling component 111 may hash the network profile data (e.g., generate a hash value using a hashing function or algorithm) before and may transmit the hashed network profile data (e.g., the encrypted network profile data) to the router or server.

In one embodiment, when transmitting the encrypted network profile data to the server, the profiling components 111 and 121 include the encrypted network profile data in existing data or traffic (e.g., include the encrypted network profile data in other messages, packets, frames, etc.) that is being transmitted to the server. In another embodiment, when transmitting the encrypted network profile data to the router, the profiling components 111 and 121 may transmit packets (or messages) that are addressed to the router (e.g., that indicate a network address of the router as the recipient of the packets).

In one embodiment, the router or server may analyze the encrypted network profile data to determine whether the encrypted network profile may indicate that the computing system 100 (e.g., computing device 110) is compromised (e.g., is not secure), as discussed in more detail below. For example, the router or server may compare the encrypted network profile data with previous encrypted network profile data to determine whether there are differences between the encrypted network profile and the previous encrypted network profile data. If the router or server determines that the computing system 100 may be compromised (e.g., may not be secure), the router or server may perform one or more security measure, as discussed in more detail below. If the router or server determines that the computing system 100 is not compromised (e.g., is secure), the router or server may allow the computing system 100 to continue communicating with the router or server.

In one embodiment, network parameters (e.g., SSIDs, user names, etc.) that may be used to determine or reveal a user's identify may be encrypted before the network parameters (which are included in the encrypted network profile data) are transmitted to the router or server. The router or server may not decrypt the encrypted network profile data when analyzing the encrypted network profile data. This may allow the router or server to determine whether the computing system 100 has been compromised (e.g., whether the computing system 100 has been hacked, is a security risk, is infected with viruses or malware, etc.) without revealing or compromising the user's identity.

Figure 2:
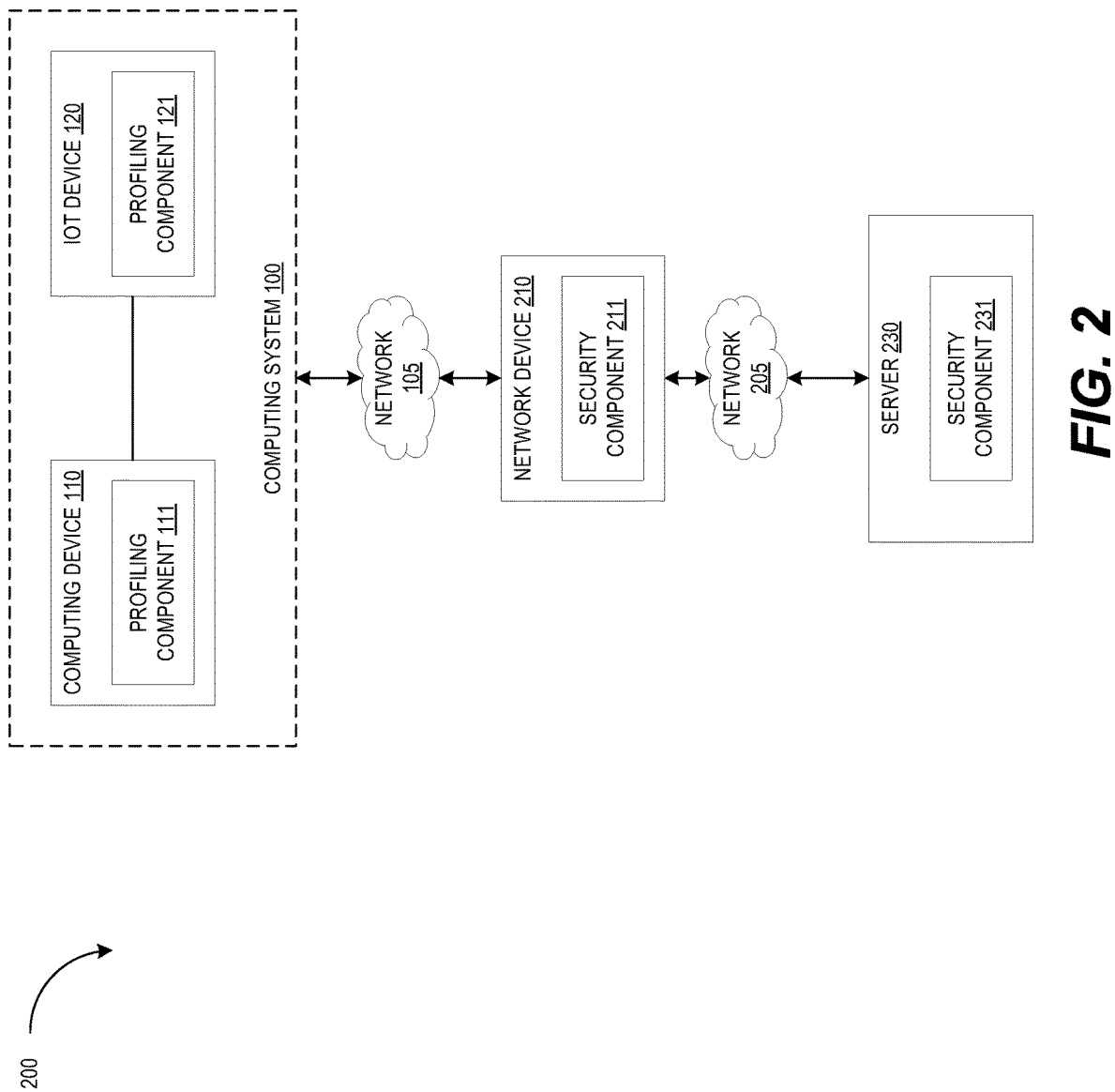
FIG. 2 illustrates a system architecture, in accordance with some embodiments of the present disclosure.

FIG. 2 illustrates a system architecture 200, in accordance with some embodiments of the present disclosure. The system architecture includes computing system 100, network 105, network device 210, network 205 and server 230. As discussed above, the computing system 100 includes computing device 110 (e.g., a smartphone, a PDA, a tablet computer, a laptop computer, a desktop computer, etc.) and an TOT device 120 (e.g., a network adaptor, a WiFi adaptor, etc.). The computing system 100 may be coupled to a network 105 and the network 105 may be implemented by network device 210, as discussed above. For example, the network 105 may be WiFi network that is implemented or provided by network device 210. In one embodiment, the network device 210 may be router (e.g., a network device that forwards data, such as messages, packets, frames, etc.) between networks. The network device 210 may be a first-hop router. A first-hop router may be a router that is coupled to both a LAN (e.g., a WiFi network) and WAN. For example, a first-hop router may allow devices (e.g., computing devices) which are coupled to a WiFi network (e.g., a LAN) to communicate with or access the Internet (e.g., a WAN). The network device 210 includes a security component 211. The security component 211 may be hardware, software, firmware, or a combination thereof. The server 230 may be a computing device (e.g., a rackmount server, a server computer, an application server, a streaming video server, etc.) that provides a service for the computing system 100. For example, the server 230 may be a server for a banking service used by a user of the computing system 100. In another example, the server 230 may be a server for a multimedia (e.g., video or audio) streaming service. The server 230 includes a security component 231. The security component 231 may be hardware, software, firmware, or a combination thereof.

In some embodiments, the network device 210 may include multiple network devices. For example, the network device 210 may include an access point (e.g., a wireless access point) and a first-hop router. When the system architecture 200 includes both an access point and a first-hop router, the access point may provide encrypted network profile data from all devices that are connected to the access point, to the first-hop router.

As discussed above, the computing system 100 (e.g., profiling components of the computing device 110 or the TOT device 120) may detect network parameters and may generate network profile data that includes the network parameters. The network parameters may include lower-layer information, middle-layer information, and higher-layer information, as discussed above. Different profiling components may generate the lower-layer information, middle-layer information, and higher-layer information, as discussed above. For example, the profiling component 111 (of the computing device 110) may transmit encrypted network profile data including lower-layer, middle-layer, and higher-layer information. In another example, the profiling component 121 (of the TOT device 120) may transmit encrypted network profile data including lower-layer and middle-layer information (because the TOT device 120 may be a network card which does not have access to higher-layer information, such as user names, passwords, authentication credentials, etc.). In a further example, the wireless access point may include middle-layer information (e.g., incoming connection requests, outgoing connection request, etc.) for all computing systems coupled to the access point, to the network device 210. This may result in duplicate information or data being sent to the network device 210 or the server 230. For example, if the profiling component 111 and profiling component 121 both transmit encrypted network profile data (that includes lower-layer or middle layer information) to the server 230, the server 230 may receive the lower-layer or middle layer information twice. In one embodiment, the profiling components or access points (e.g., wireless access points) may monitor the packets, messages, etc., transmitted by the computing device 110 to determine if duplicate information is being transmitted. For example, the profiling component 121 may determine if encrypted network profile data has already been sent by the computing device 110 (e.g., in packet to the network device 210, or included in existing packets or messages). If encrypted network profile data has already been sent by the computing device 110, the profiling component 111 may not collect network profile data (e.g., may not detect the network parameters) and may not transmit network profile data. In another example, if an access point (not illustrated in FIG. 2) determines that the packets (or messages) received from the computing device 110 (or IOT device 120) include network profile data, the access point may not collect or transmit network profile data.

In one embodiment, the encrypted network profile data may be inserted into a stream of packets that are being transmitted to the network device 210. For example, the encrypted network profile data may be included in packets (or messages, frames, etc.) which may be directed or addressed to the network device. The packets (that include the encrypted network profile data) may be inserted into a stream of packets that are being transmitted to the network device 210. For example, every n-th (e.g., fifth) packet of the stream may be a packet that includes the encrypted network profile data. The destination address of the packets (that include the encrypted network profile data) may be the network address (e.g., the IP address) of the network device 210. The destination port of the packets that include the encrypted network profile data may also be specific port (e.g., a user datagram protocol (UDP) port) where the network device 210 is expecting to receive the encrypted network profile data. The source address of the packets (that include the encrypted network profile data) may be the network address (e.g., the IP address) of the computing device 110 or IOT device 120.

In one embodiment, the security component 211 of the network device 210 may receive and analyze the encrypted network profile data to determine whether encrypted network profiled indicates that the computing device 110 may be comprimised (e.g., to determine whether the computing device 110 has been infected with viruses or malware, poses a security risk, etc.). In one embodiment, the security component 211 may determine (e.g., calculate, generate, etc.) the hash values of the source and destination addresses (e.g., IP address, MAC address, etc.) of the packets (that include the encrypted network profile data). The security component 211 may determine whether the hash values are the same as the hashed (e.g., encrypted) source and destination addresses of the computing system 100 and the hashed network address of the network device 210, that were included in the packets. This may allow the security component 211 to prevent other devices from spoofing the network profile data (e.g., prevent other devices from pretending that they are computing device 110).

In one embodiment, the security component 211 (or the security component 231) may compare different portions of the encrypted network profile data with portions of previously received encrypted network profile data to determine whether encrypted network profiled data may indicate that the computing system 100 (e.g., computing device 110, the TOT device 120, etc.) has been compromised (e.g., is not secure), as discussed in more detail below. The security component 211 (or the security component 231) may also perform one or more security measures if the security component 211 (or the security component 231) determines that the computing system 100 may be compromised (e.g., may not be secure) or determines that there may be suspicious activity occurring. This may allow the network device 210 to detect suspicious activity (e.g., to detect attacks such as denial of service attacks, to detect hacking attempts, etc.) that is being performed by compromised computing devices (e.g., computing devices that are infected with malware or viruses) on the network 105 or that is occurring to computing devices.

For example, the security component 211 (or the security component 231) may compare the portion of the network profile data that includes a list (e.g., a history) of rejected incoming connections due to unopened ports, with previous network profile data that includes a list of previously rejected incoming connections due to unopened ports. If there are many rejected incoming connections (or new rejected incoming connections) due to unopened ports, this may indicate that the computing device 110 or TOT device 120 was the target of port scanning (e.g., suspicious activity) or may be compromised (e.g., may not be secure). If the port scans are received from a small number of network address (e.g., from a small number of devices), the security component 211 may drop some or all of the packets that are received from those network address (e.g., may not deliver packets or messages received from those network address, to the computing system 100).

In another example, the security component 211 (or the security component 231) may compare the portion of the network profile data that indicates a list of rejected incoming connections due to authentication failures (e.g., invalid authentication credentials, invalid username or password, etc.), with previous network profile data that includes a list of previously rejected incoming connections due to authentication failures. If there are many rejected incoming connections (or new rejected incoming connections) due to authentication failures, this may indicate that the computing device 110 or TOT device 120 was the target of hacking (e.g., suspicious activity) or may be compromised (e.g., may not be secure). If the rejected incoming connections are received from a small number of network address (e.g., from a small number of devices), the security component 211 may drop (some or all) packets that are received from those network address (e.g., may not deliver packets or messages received from those network address, to the computing system 100).

In a further example, the security component 211 (or the security component 231) may compare the portion of the network profile data that indicates a list (e.g., a history) of rejected outgoing connection requests (due to unopened ports or authentication failures), with previous network profile data that includes a list of previous rejected outgoing connection requests (due to unopened ports or authentication failures). If there are many rejected outgoing connection requests (or new rejected outgoing requests), this may indicate that the computing device 110 may be compromised (e.g., may not be secure, is a security risk, is infected with viruses or malware, etc.) and has been trying to scan ports of other devices or hack into other devices.

In one embodiment, the security component 231 (or the security component 211) may compare different portions of the encrypted network profile data with previous portions of previously received encrypted network profile data to determine whether encrypted network profile data may indicate that the computing system 100 (e.g., computing device 110, the TOT device 120, etc.) has been compromised (e.g., is not secure), as discussed in more detail below. The security component 231 (or the security component 211) may also perform one or more security measures if the security component 231 (or the security component 211) determines that the computing system 100 may be compromised (e.g., may not be secure) or determines that there may be suspicious activity occurring. This may allow the network device 210 to detect suspicious activity (e.g., to detect attacks such as denial of service attacks, to detect hacking attempts, etc.) that is being performed by compromised computing devices (e.g., computing devices that are infected with malware or viruses) or that is occurring to computing devices. This may also allow the network device 210 to prevent attacks or hacking attempts from reaching the server 230 (e.g., to act as a first line of defense) by dropping or discarding packets when suspicious behavior is detected.

In one embodiment, the server 230 may not be a server that is dedicated to monitoring computing devices to receiving network profile data and determining whether the computing devices may be compromised (e.g., may not be secure). The server 230 may be a server that provides services or functions for the computing system 100, as discussed above. This allows existing servers to be used to detect when a computing device may be compromised (e.g., may not be secure) and when a computing device is performing suspicious activities (e.g., port scanning). Using existing servers to detect when a computing device may be compromised (e.g., may not be secure) or is performing suspicious activities may reduce costs because an additional dedicated server may not be needed to perform these functions.

In one embodiment, the profiling component may transmit the encrypted network profile data to the server 230 by including the encrypted network profile data in existing messages that are being transmitted to the server. The profiling data may not be transmitted to the server 230 using a dedicated message or dedicated packet. The profiling data may be piggybacked onto existing messages or packets that are being transmitted to the server 230. For example, the server 230 may be a server that provides streaming video (e.g., video data, video content, etc.) to the computing device 110. When the computing device 110 transmits a request to access different videos (e.g., to download videos, etc.), the profiling component 111 may include the encrypted network profile data in the messages. For example, the computing device 110 may be a hypertext transfer protocol (HTTP) message to request access to a video. The profiling component 111 may include the network profile data in the HTTP message using HTTP directives. An HTTP directive may have the format of a name-value pair (e.g., "name=value") where the name may be an identifier for the network parameter that is represented by a portion of the network profile data (e.g., the name may indicate that the HTTP directive includes the SSID of the network 105) and where the value may be the hashed (or encrypted) version of the SSID.

In one embodiment, the security component 231 may compare different portions of the encrypted network profile data with portions of previously received encrypted network profile data to determine whether encrypted network profile indicates that the computing system 100 (e.g., computing device 110, the IOT device 120, etc.) may be compromised (e.g., may not be secure) or is performing suspicious activities (e.g., port scanning, multiple login or authentication attempts, etc.), as discussed in more detail below. If the security component 231 does not detect suspicious activity or determines that the computing system 100 has not been compromised (e.g., is not a security risk, is secure, etc.), the security component 231 may allow the server 230 to communicate (e.g., transmit and receive packets or messages) with the computing system 100.

In one embodiment, the security component 231 may perform one or more security measures if the security component 231 determines that the computing system 100 may be compromised (e.g., may not be secure) or determines that there may be suspicious activity occurring. For example, the security component 231 may drop some (or all) of the messages or packets received from the computing system 100 (e.g., from the computing device 110) if the security component 231 detects suspicious activity or determines that the computing system 100 may be compromised (e.g., may not be secure). In another example, the security component 231 may transmit a message to the computing system 100 requesting additional authentication. For example, the security component 231 may transmit security questions (e.g., a pet's name, mother's maiden name, first car, etc.) to the computing system 100. If the computing system 100 does not provide the additional authentication (e.g., additional passwords, answers to security questions, etc.), the security component 231 may not allow the computing system 100 to communicate with the server 230 (e.g., may drop, discard, ignore, etc., packets or messages received from the computing system 100).

In one embodiment, the encrypted network profile data (that is transmitted by the computing device 110 or the IOT device 120) may not be decrypted by the security components 211 and 231. The security components 211 and 231 may compare different versions (e.g., a current version and a previous version) of the encrypted network profile data to determine or identify differences between the versions of the encrypted network profile data, as discussed below. Using the encrypted network profile data (without decrypting the encrypted network profile data) may allow the network device 210 and the server 230 to protect the identity of a user of the computing system 100 because information that may be used to identify the user (e.g., user names, network addresses, SSIDs, etc.) remains encrypted (e.g., remains hashed). The network device 210 and the server 230 may still use the encrypted network parameters detected by the computing system 100 while preserving the user's anonymity.

In one embodiment, the server 230 may instruct the network device 210 to perform one or more security measures if the security component 231 determines that the computing system 100 may be compromised (e.g., may not be secure) or determines that there may be suspicious activity occurring. For example the server 230 may transmit one or more messages to the network device 210 indicating that one or more packets received from the IOT device 120 should be dropped or that the IOT device 120 should not be allowed to communicated with the network device 210.

Figure 3:
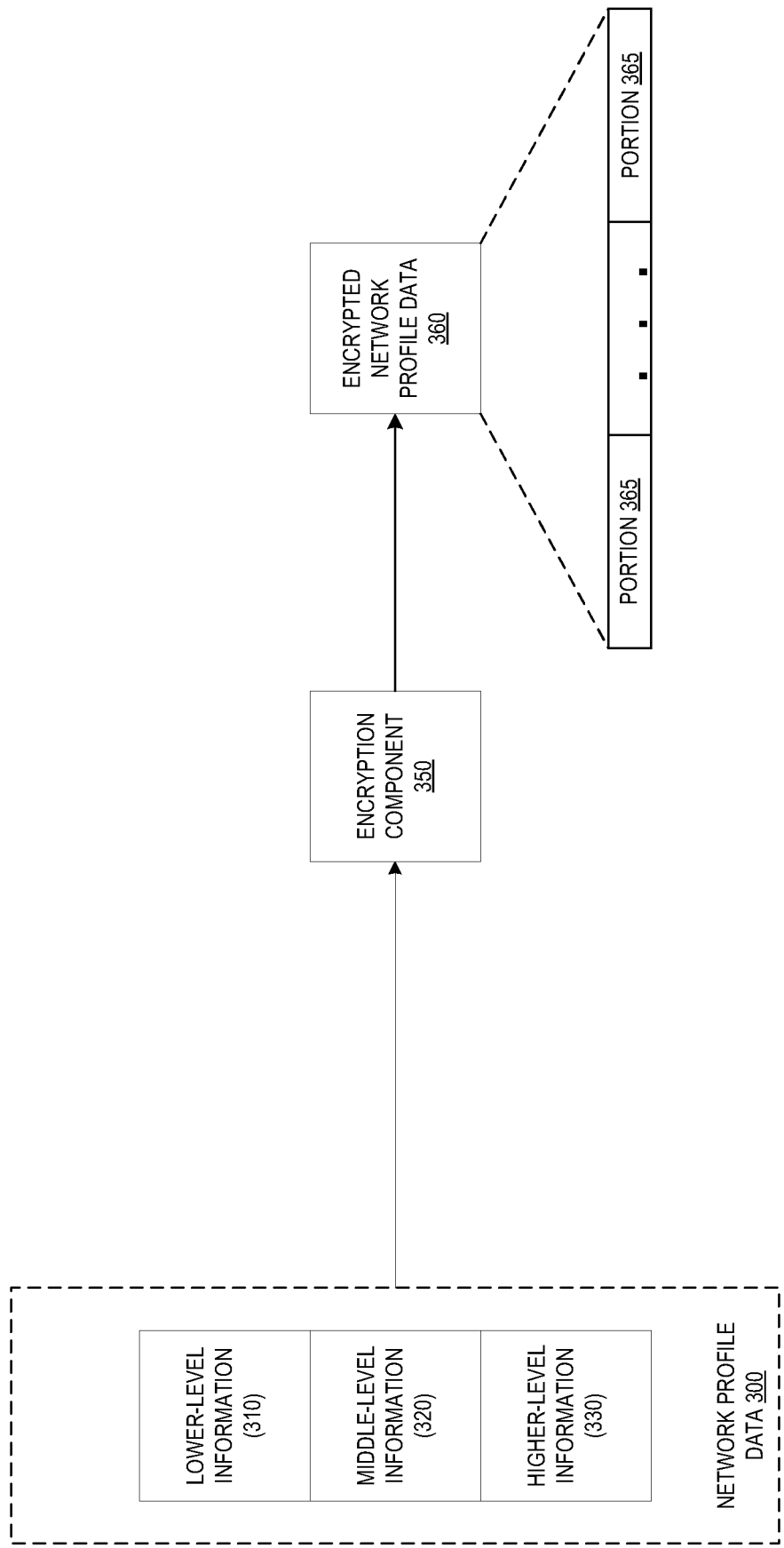
FIG. 3 illustrates example network profile data, in accordance with some embodiments of the present disclosure.

FIG. 3 illustrates example network profile data 300, in accordance with some embodiments of the present disclosure. As discussed above, a profiling component (e.g., profiling components 111 and 121, illustrated in FIGS. 1 and 2) may obtain or generate network profile data based on network parameters detected by a device (e.g., a computing device, an IOT device, etc.). The network parameters may include may include lower-level information 310, middle-layer information 320, and higher-level information 330. Lower-level information 310 may include link layer or Internet layer information such as network addresses (e.g., IP or MAC address), network identifiers, device identifiers (e.g., names, alphanumeric values, etc.), Bluetooth addresses, or other identifiers and addresses used by other communication protocols (e.g., BLE, Zigbee, Z-Wave, etc.).

Middle-layer information may include transport layer information such as ports or port numbers, incoming connection requests, outgoing connection requests, whether incoming connection requests were rejected, whether outgoing connection requests were rejected, etc. Higher-layer information may include application layer information such as incoming authentication requests, authentication credentials, and results, outgoing authentication requests, authentication credentials and results, etc.

In one embodiment, the network profile data 300 may be provided to an encryption component 350 to encrypt the network profile data (to generate encrypted network profile data 360). The encryption component 350 may be hardware, software, firmware, or a combination thereof, that may encrypt data or information. The encryption component 350 may use various methods, algorithms, functions, operations, etc., to encrypt data. For example, the encryption component 350 may use a hash function (e.g., a cryptographic hash function) to encrypt the network profile data 300 (or portions of the network profile data). Examples of hashing functions include message digest (MD) hash functions (e.g., MD4, MD5, etc.), a secure hashing algorithm (e.g., SHA-1, SHA-256), etc.

The encrypted network profile data 360 may be divided into multiple portions 365. Each portion 365 may correspond to a network parameter detected by the device. For example, a first set of portions 365 may correspond to a list rejected incoming connection requests (due to authentication failures or unopened ports), with each portion 365 of the first set of portions 365 corresponding to one rejected incoming connection request from the list of rejected incoming connection requests. In another example, a second set of portions 365 may correspond to a set of network identifiers (e.g., a list of SSIDs) detected by the device, with each portion 365 of the second set of portions 365 corresponding to a network identifier from the set of network identifiers. In another example, a third set of portions 365 may correspond to a set of device identifiers (e.g., a list of device names) detected by the device, with each portion 365 of the third set of portions 365 corresponding to a device identifier from the set of device identifiers.

In one embodiment, when the profiling component transmits the encrypted network profile data 360 to a network device (e.g., a router), the profiling component may include the portions 365 in packets that are addressed to the network device (e.g., that indicate the source address of the network device as the recipient of the packets), as discussed above. In another embodiment, when the profiling component transmits the encrypted network profile data 360 to a server, the profiling component may include the portions 365 of the encrypted network profile data 360 in HTTP directives, as discussed above. For example, the profiling component may add an HTTP directive for each portion 365 (e.g., for each SSID, for each network address, for each incoming connection request, for each outgoing connection request, etc.). The HTTP directive may have a name that identifies the network parameter included in the HTTP directive. For example, the HTTP directive may be named "network-profile-xyz" where "xyz" is the name of the network parameter (e.g., SSID, IP address, MAC address, device name, etc.). The value of the HTTP directive may be the hashed (or encrypted) version of network parameter. For example, the value of the HTTP directive may be a hash value generated based on the SSID or a MAC address (e.g., a network parameter). If a list of network parameters is transmitted (e.g., a list of rejected incoming connection requests), a first HTTP directive may include the size of the list and the other HTTP directive may correspond to the individual network parameters in the list.

In one embodiment, the portions 365 may represent the network parameters in a specific order. For example, the first third of the portions 365 may represent lower-level information, the second third of the portions 365 may represent middle-lower portions, and the last third of the portions 365 may represent higher-level portions. In another example, each network parameter may be represented using a specific number of portions 365 in a specific order. For example, the first three portions 365 may represent SSIDs detected by a device, the next five portions 365 may represent source MAC address detected by a device, the next two portions 365 may represent incoming connection requests, the next two portions 365 may represent outgoing connection request, etc.

When a network device (e.g., a router) or server receives the encrypted network profile data 360, the network device or server may store the encrypted network profile data 360 in one or more first-in-first out (FIFO) queues. For example, the network device or server may maintain a FIFO queue where entry in the queue includes a version of encrypted network profile data generated by the device. In another example, the network device or server may maintain a FIFO queue for each type of network parameters in the encrypted network profile data. For example, a first FIFO queue may include portions of network profile data that correspond to SSIDs, a second FIFO queue may include portions of network profile data that correspond to network address, a third FIFO queue may include portions of network profile data that correspond to network identifiers, etc.

In one embodiment, a security component (e.g., security components 211 and 231) may determine whether a threshold number of portions 365 of the encrypted network profile data 360 are different from previous versions of the encrypted network profile data. If a threshold number of portions of the encrypted network profile data are different from previous versions of the encrypted network profile data, the security components 211 and 231 may determine that the computing system 100 may be compromised (e.g., may not be secure) or is performing suspicious activities. For example, the security component may compare each portion 365 of the encrypted network profile data 360 with each portion of previously received encrypted network profile data (which may be stored in a FIFO queue). If a threshold number of portions 365 are different than previous portions (e.g., if the more than fifteen percent of the hash values are not the same, more than ten of the hash values are not the same, etc.), the security component may determine that the device may be compromised (e.g., may not be secure) or that the device is performing suspicious activities.

Figure 4:
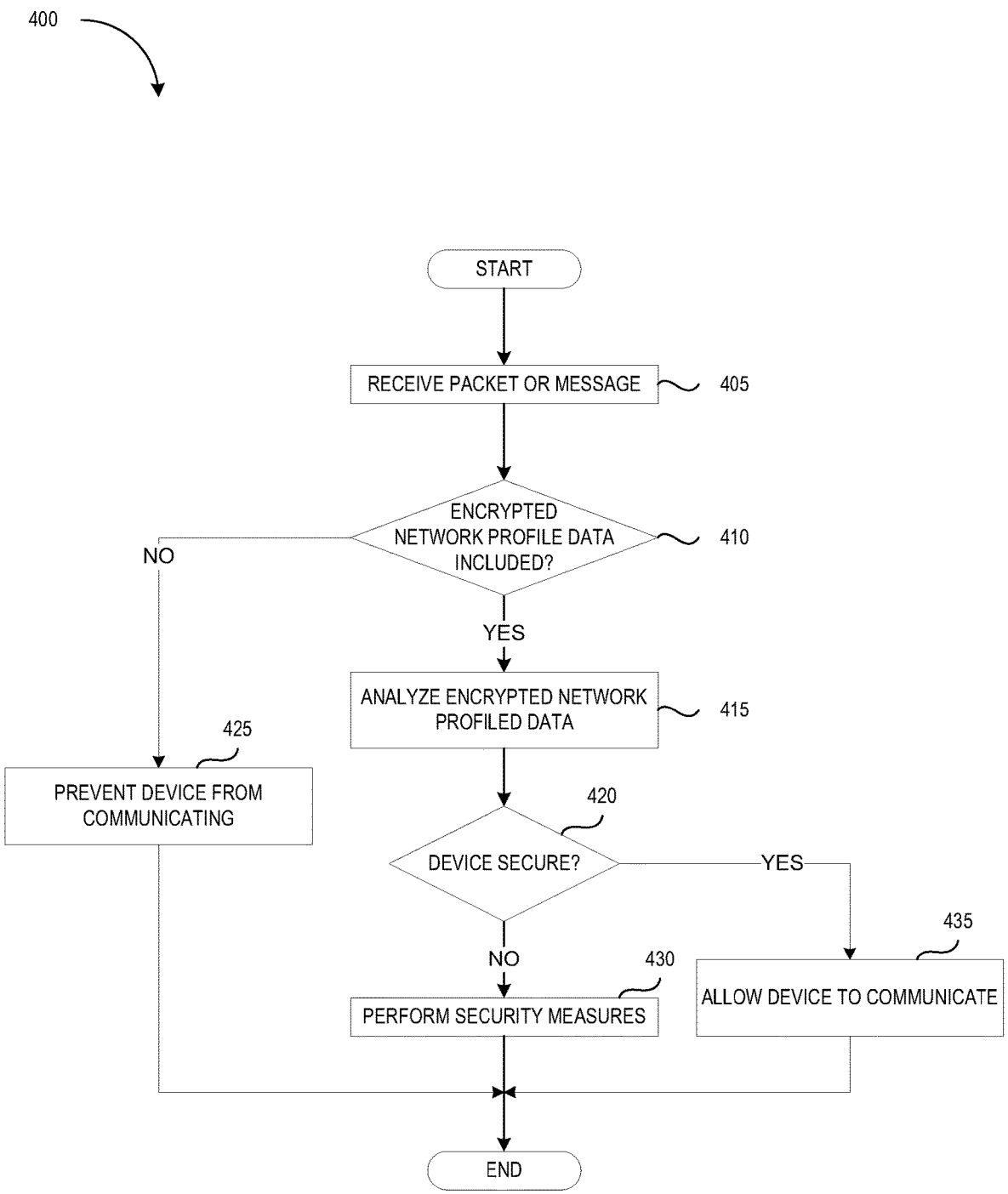
FIG. 4 is a flow diagram of a method of analyzing network profile data, in accordance with some embodiments of the present disclosure.

FIG. 4 is a flow diagram of a method 400 of analyzing network profile data, according to some embodiments of the present disclosure. Method 400 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by a security component (e.g., security components 211 and 231 illustrated in FIG. 3), a network device (e.g., network device 210 illustrated in FIG. 3), a server (e.g., server 230 illustrated in FIG. 3), or a processing device (e.g., processing device 602 illustrated in FIG. 6).

The method 400 begins at block 405, where the method 400 receives a packet a message. For example a UDP packet or an HTTP message may be received from a device (e.g., from a computing device, an IOT device, a computing system etc.). At block 410, the method 400 optionally determines whether encrypted network profile data is included in the message or packet. For example, the method 400 may determine whether the HTTP message includes HTTP directives, as discussed above. If encrypted network profile data is not included, the method 400 may optionally prevent the device from communicating at block 425. For example, the method 400 may prevent the device from communicating with a server or a router.

If the encrypted network profile data is included, the method 400 proceeds to block 415 where the method analyzes the encrypted network profile data. At block 420 the method 400 determines whether the device may be compromised (e.g., may not be secure). For example, the method 400 may compare the encrypted network profile data (or portions of the encrypted network profile data) with previous version of the encrypted network profile data, as discussed above. The method 400 may compare the encrypted network profile data without decrypting the encrypted network profile data to protect the identity of a user of the device, as discussed above.

If the device has not been compromised (e.g., there are more than a threshold number of portions of the encrypted network profile data that are different from previous portions of previous encrypted network profile data), the method 400 proceeds to block 430 where the method 400 may perform one or more security measures. For example, the method 400 may drop (e.g., discard) one or more packets or messages received from the device. In another example, the method 400 may request additional authentication (e.g., may request additional credentials). If the device has not been compromised (e.g., there less than or equal to a threshold number of portions of the encrypted network profile data that are different from previous portions of previous encrypted network profile data), the method 400 proceeds to block 435 where the method 400 may allow the device to communicate with a server or a router.

Figure 5:
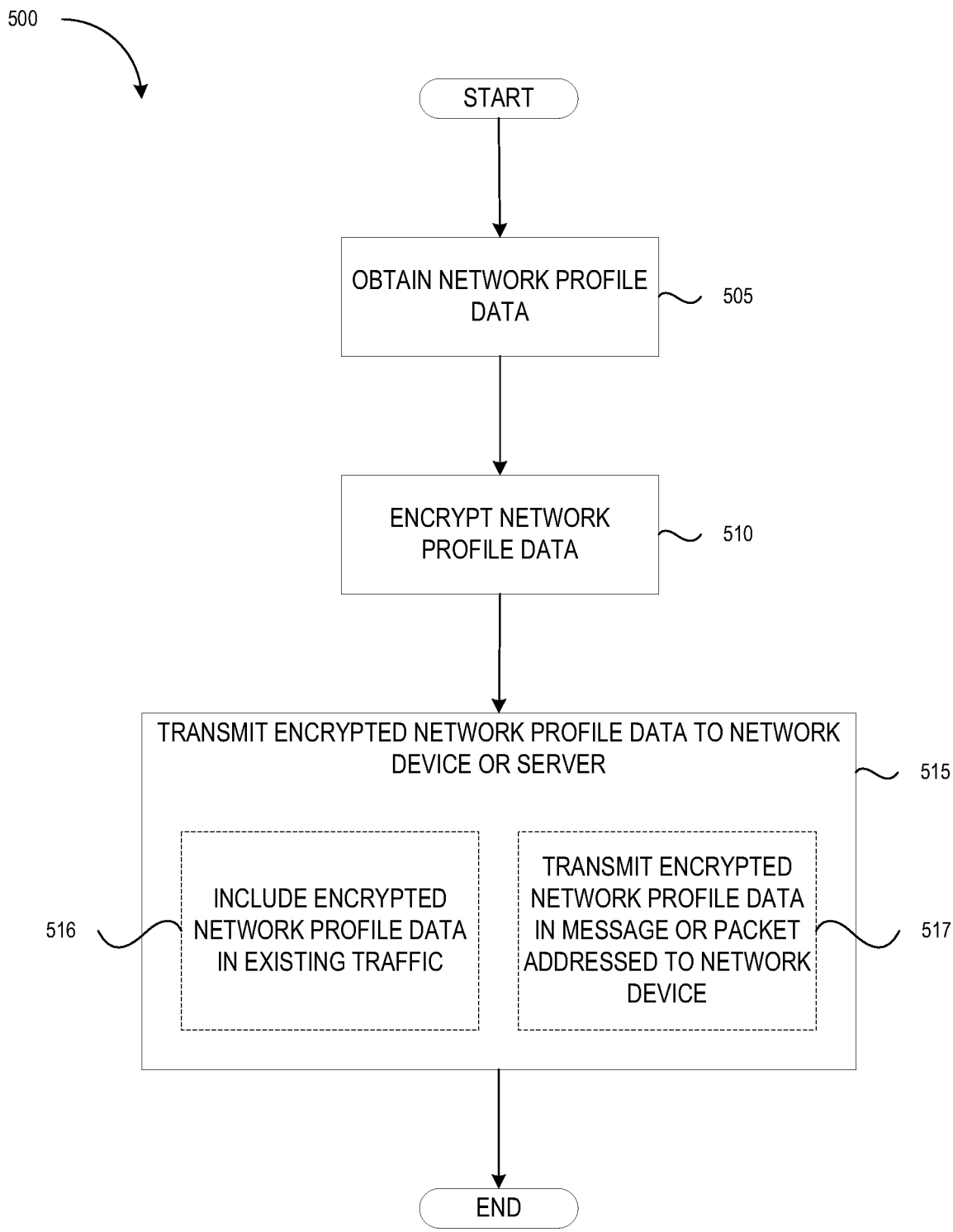
FIG. 5 is a flow diagram of a method of obtaining network profile data, in accordance with some embodiments of the present disclosure.

FIG. 5 is a flow diagram of a method 500 of obtaining network profile data according to some embodiments of the present disclosure. Method 500 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 500 may be performed by a profiling component (e.g., profiling components 111 and 121 illustrated in FIGS. 1 and 2), a computing device (e.g., computing device 110 illustrated in FIGS. 1 and 2), or a processing device (e.g., processing device 602 illustrated in FIG. 6).

The method 500 begins at block 505, where the method 500 obtains network profile data. For example, the method 500 may detect network parameters (e.g., network address, network identifiers, incoming connection requests, outgoing connection requests, etc.). The method 500 may generate network profile data that includes the network parameters (e.g., includes one or more of lower-level information, middle-level information, higher-level information, etc.). At block 510, the method 500 may encrypt the network profile data. For example, the method 500 may generate one or more hash values based on the network parameters, as discussed above. The encrypted network profile data may be divided into multiple portions, each of which may include multiple hash values. At block 515, the method 500 may transmit the encrypted network profile data to a network device (e.g., a first-hop router) or a server. For example, the method 500 may include the encrypted network profile data in existing traffic or data that is being transmitted to a server (e.g., may include one or more HTTP directives in an HTTP message), as illustrated in block 516. In another example as illustrated in block 517, the method 500 may transmit the encrypted network profile data in a message or a packet that is addressed to the network device (e.g., that indicates the network device as the recipient of the message or packet), as discussed above.

Figure 6:
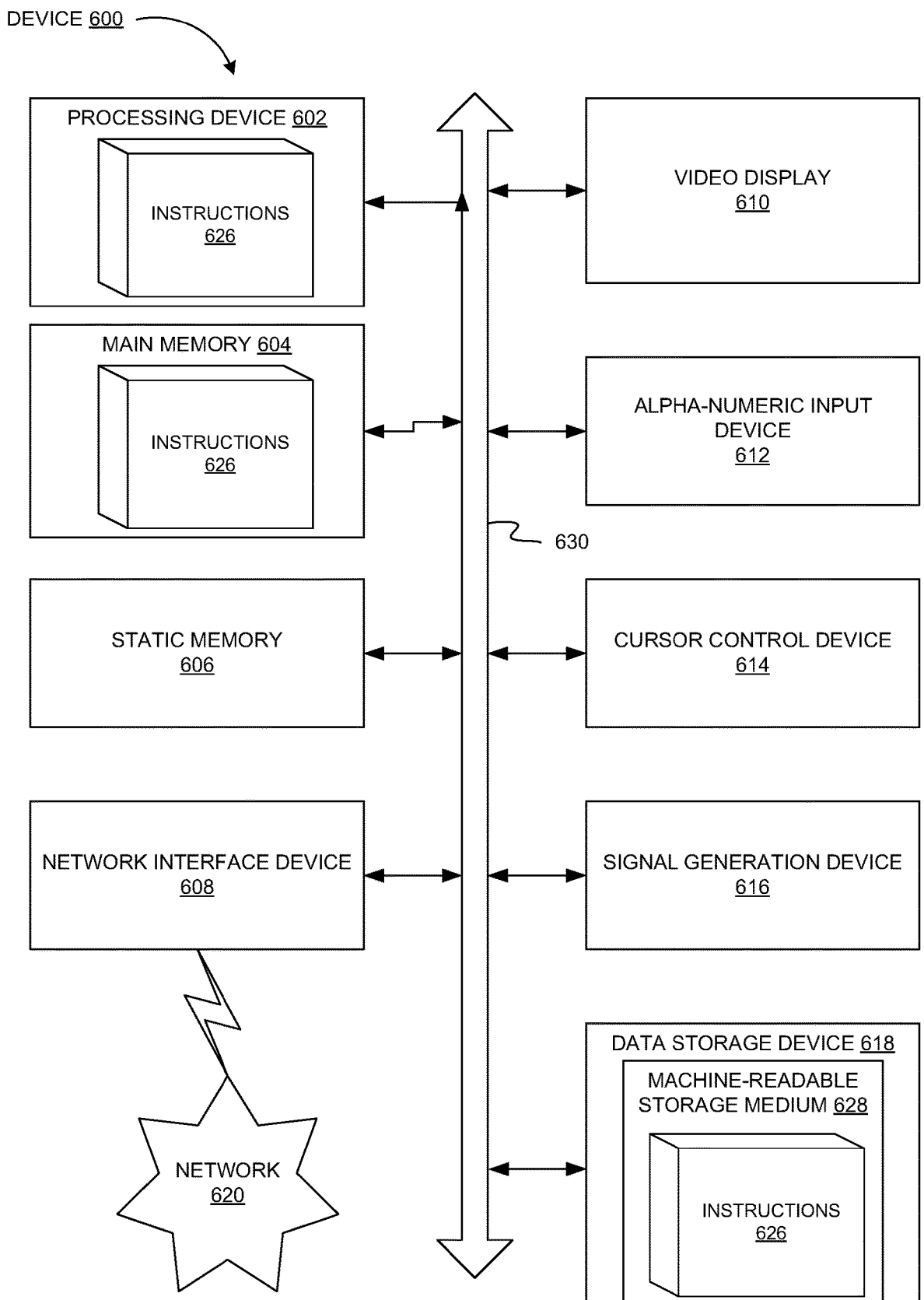
FIG. 6 is a block diagram of an example device that may perform one or more of the operations described herein, in accordance with some embodiments of the present disclosure.

FIG. 6 is a block diagram of an example device 600 that may perform one or more of the operations described herein, in accordance with some embodiments. Device 600 may be connected to other devices in a LAN, an intranet, an extranet, and/or the Internet. The device may operate in the capacity of a server machine in client-server network environment or in the capacity of a client in a peer-to-peer network environment. The device may be an electronic or computing device (such as a personal computer (PC), a tablet computer, a PDA, a smartphone, a set-top box (STB), a server computer, etc.), a network device (such as a router, switch or bridge), or any machine capable of executing a set of instructions (sequential or otherwise) that specify actions to be taken by that machine. Further, while only a single device is illustrated, the term "device" shall also be taken to include any collection of devices that individually or jointly execute a set (or multiple sets) of instructions to perform the methods discussed herein.

The example device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Device 600 may further include a network interface device 608 which may communicate with a network 620. The device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Instructions implementing instructions 626 for one or more of a profiling component or a security component may also reside, completely or at least partially, within main memory 604 and/or within processing device 602 during execution thereof by device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In some embodiments, the example device 600 may include a subset of the components illustrated in FIG. 6. For example, the example device 600 may include the processing device, the main memory 604 (or other type or data storage device, such as a persistent data storage device), and the network interface device 608.

Unless specifically stated otherwise, terms such as "obtaining," "encrypting," "transmitting," "including," "dropping," "receiving," "determining," "performing," "comparing," "requesting," "preventing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus comprising:
a memory configured to store a plurality of encrypted network profile data including first and second encrypted network profile data; and
a processing device operatively coupled to the memory, the processing device configured to:
receive second encrypted network profile data indicating a set of network parameters detected by an electronic device,
determine whether the electronic device is compromised by:
comparing the second encrypted network profile data to the first encrypted network profile data, wherein the comparison of the second encrypted network profile data to the first encrypted network profile data occurs without decrypting either the first or the second encrypted network profile data,
identifying portions of the second encrypted network profile data that are different from corresponding portions of the first encrypted network profile data,
counting the identified portions,
comparing the number of identified portions to a threshold number, and
if the number of identified portions is greater than the threshold number, determining that the electronic device is compromised,
in response to determining that the electronic device is comprised, performing at least one security measure, and
in response to determining that the electronic device is not compromised, permitting communication between the electronic device and the apparatus.

2. The apparatus of claim 1, wherein to perform the at least one security measure, the processing device is further configured to:
drop one or more packets received from the electronic device.

3. The apparatus of claim 1, wherein to perform the at least one security measure, the processing device is further configured to:
request authentication credentials from the electronic device.

4. The apparatus of claim 1, wherein the apparatus is one of a router and a server.

5. The apparatus of claim 1, wherein the apparatus is configured as a first-hop router coupled to a local area network (LAN) and a wide area network (WAN).

6. The apparatus of claim 1, wherein the encrypted network profile data is received in existing traffic transmitted to the apparatus.

7. The apparatus of claim 1, wherein the encrypted network profile data is received in one or more packets addressed to the apparatus.

8. The apparatus of claim 1, wherein the set of network parameters comprises a network address of the apparatus.

9. The apparatus of claim 1, wherein the set of network parameters comprises a network identifier of a network detected by the apparatus.

10. The apparatus of claim 1, wherein the set of network parameters comprises one or more device identifiers of one or more electronic devices detected by the apparatus.

11. The apparatus of claim 1, wherein the set of network parameters comprises one or more of:
a list of rejected incoming connection requests; and
a list of rejected outgoing connection requests.

12. A method for analyzing network profile data comprising:
receiving by a wireless controller second encrypted network profile data indicating a set of network parameters detected by an electronic device, determining by the wireless controller whether the electronic device is compromised by:
comparing the second encrypted network profile data to the first encrypted network profile data, the first encrypted network profile stored in a memory, wherein the comparison of the second encrypted network profile data to the first encrypted network profile data occurs without decrypting either the first or the second encrypted network profile data,
identifying portions of the second encrypted network profile data that are different from corresponding portions of the first encrypted network profile data,
counting the identified portions,
comparing the number of identified portions to a threshold number, and
if the number of identified portions is greater than the threshold number, determining that the electronic device is compromised,
in response to determining that the electronic device is comprised, performing, by the wireless controller, at least one security measure, and
in response to determining that the electronic device is not compromised, permitting, by the wireless controller, communication between the electronic device and the wireless controller.

13. The method for analyzing network profile data of claim 12, wherein to performing the at least one security measure comprises dropping one or more packets received from the electronic device.

14. The method for analyzing network profile data of claim 12, wherein to performing the at least one security measure comprises requesting authentication credentials from the electronic device.

15. The method for analyzing network profile data of claim 12, wherein the set of network parameters comprises a network address of a wireless apparatus including the wireless controller.

16. The method of claim 12, wherein the set of network parameters comprises a network identifier of a network detected by a wireless apparatus including the wireless controller.

17. The method of claim 12, wherein the set of network parameters comprises one or more device identifiers of one or more electronic devices detected by a wireless apparatus including the wireless controller.

18. The method of claim 12, wherein the set of network parameters comprises one or more of:
   a list of rejected incoming connection requests; and
   a list of rejected outgoing connection requests.

\* \* \* \* \*